(12) United States Patent
Mallinjoud

(10) Patent No.: US 11,063,401 B2
(45) Date of Patent: Jul. 13, 2021

(54) DEVICE FOR MECHANICAL CONNECTION AND FOR OPTICAL AND/OR ELECTRICAL AND/OR FLUID TRANSMISSION BETWEEN A FIRST ELEMENT AND A SECOND ELEMENT

(71) Applicant: Sébastien Mallinjoud, Cesson la Foret (FR)

(72) Inventor: Sébastien Mallinjoud, Cesson la Foret (FR)

(*) Notice: Subject to any disclaimer, the term of this patent is extended or adjusted under 35 U.S.C. 154(b) by 64 days.

(21) Appl. No.: 16/620,201

(22) PCT Filed: Jun. 4, 2018

(86) PCT No.: PCT/EP2018/064640
§ 371 (c)(1),
(2) Date: Dec. 6, 2019

(87) PCT Pub. No.: WO2018/224446
PCT Pub. Date: Dec. 13, 2018

(65) Prior Publication Data
US 2020/0099187 A1     Mar. 26, 2020

(30) Foreign Application Priority Data
Jun. 9, 2017    (FR) .................................. 1755174

(51) Int. Cl.
*H01R 39/64*    (2006.01)
*F16L 27/04*    (2006.01)
(Continued)

(52) U.S. Cl.
CPC ............ *H01R 39/643* (2013.01); *F16L 27/04* (2013.01); *G02B 6/3604* (2013.01); *H04B 10/801* (2013.01); *H01R 35/02* (2013.01)

(58) Field of Classification Search
CPC ...... H01R 39/643; H01R 35/04; H01R 39/64; H01R 39/60; H01R 12/52; H01R 35/02;
(Continued)

(56) References Cited

U.S. PATENT DOCUMENTS

| 294,851 | A | 3/1884 | Childs | |
| 6,497,579 | B1 * | 12/2002 | Garbini | .............. H01R 13/6315 439/63 |

(Continued)

FOREIGN PATENT DOCUMENTS

| DE | 100 50 890 A1 | 4/2002 |
| DE | 102 30 481 A1 | 1/2004 |
| EP | 2 073 408 A1 | 6/2009 |

OTHER PUBLICATIONS

French Search Report dated Feb. 20, 2018 for corresponding French Application No. 11755174.

(Continued)

*Primary Examiner* — Briggitte R. Hammond
(74) *Attorney, Agent, or Firm* — Pearne & Gordon LLP

(57) ABSTRACT

A device for achieving a mechanical link and optical and/or electrical and/or fluidic transmission between a first element (E1) and a second element (E2), including: a first connection part designed to be fixed to the first element (E1), a first joining member connected optically and/or electrically and/or in fluidic communication with the first element (E1) and mounted on the first connection part, a second connection part designed to be fixed to the second element (E2), and arranged at least in part between the first connection part and the first joining member and defining a ball joint link between the first and second elements, and a second joining member connected optically and/or electrically and/or in fluidic communication with the second element (E2), arranged in the second connection part, the first and second
(Continued)

joining members being configured to allow an optical and/or electrical and/or fluidic transmission from one to the other.

11 Claims, 14 Drawing Sheets

(51) Int. Cl.
*G02B 6/36* (2006.01)
*H04B 10/80* (2013.01)
*H01R 35/02* (2006.01)

(58) Field of Classification Search
CPC ........ F16C 11/06; F16L 27/04; G02B 6/3604; H04B 10/801
See application file for complete search history.

(56) References Cited

U.S. PATENT DOCUMENTS

| | | | |
|---|---|---|---|
| 7,854,614 B2* | 12/2010 | Robb | G02B 6/3604 439/8 |
| 2009/0152442 A1 | 6/2009 | Hemmeter et al. | |
| 2015/0093917 A1* | 4/2015 | Stern | H01R 35/04 439/8 |

OTHER PUBLICATIONS

International Search Report dated Aug. 2, 2018 for corresponding International Application No. PCT/EP2018/064640.
Written Opinion dated Aug. 2, 2018 for corresponding International Application No. PCT/EP2018/064640.

* cited by examiner

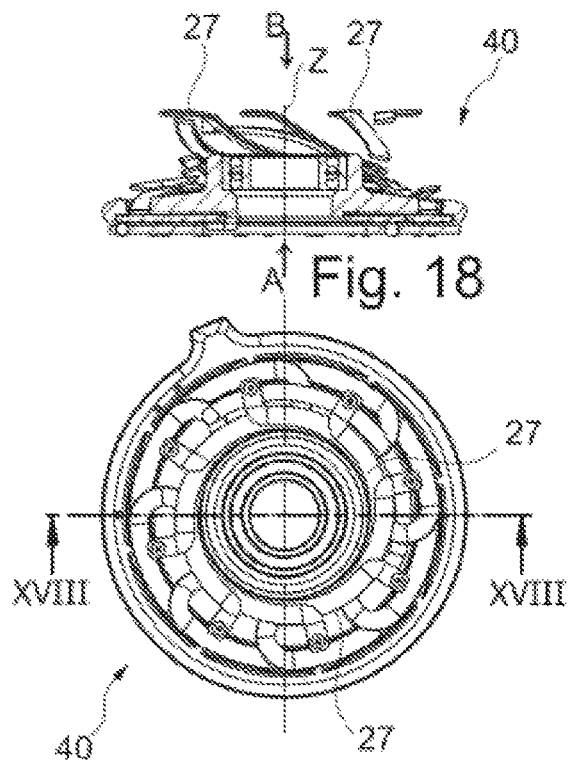
Fig. 18
Fig. 17b
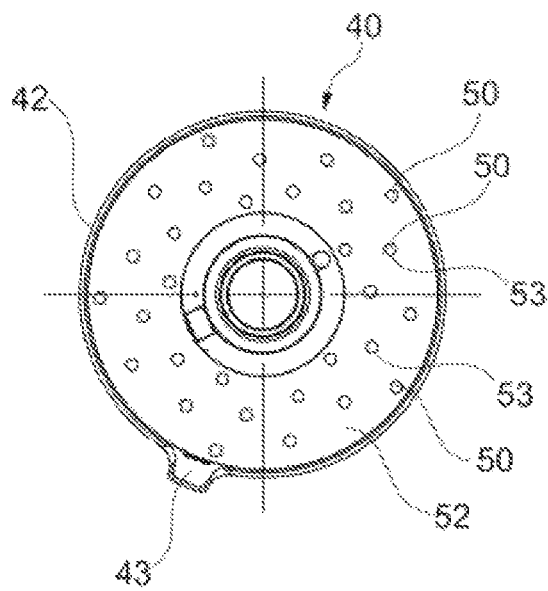
Fig. 17a
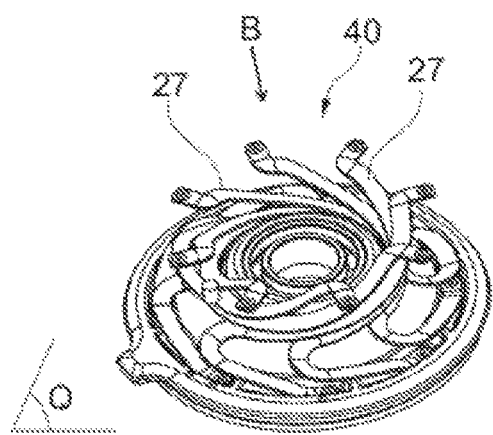
Fig. 16b
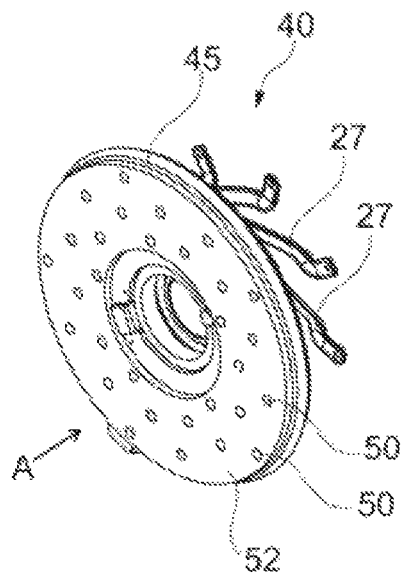
Fig. 16a

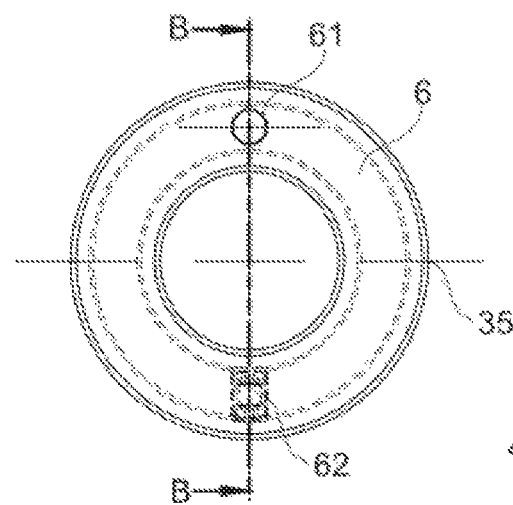
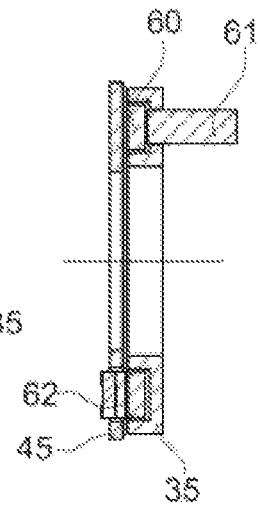
Fig. 23a  Fig. 23b
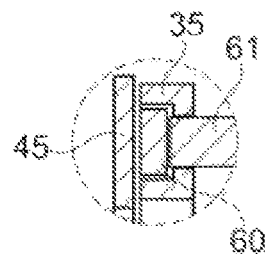
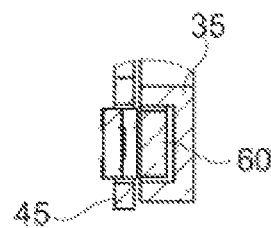
Fig. 23c  Fig. 23d
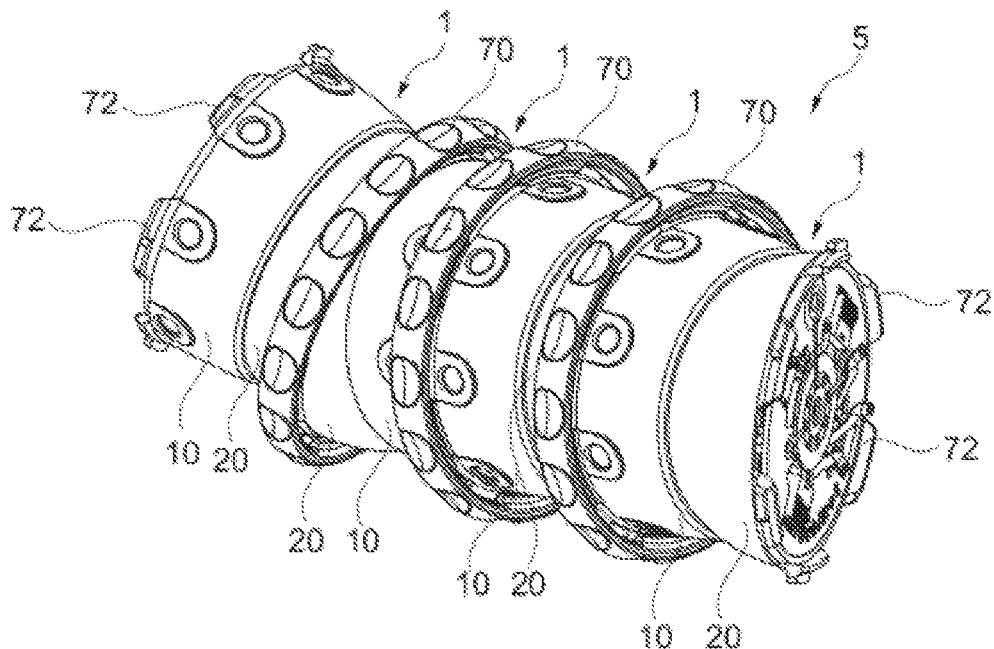
Fig. 24

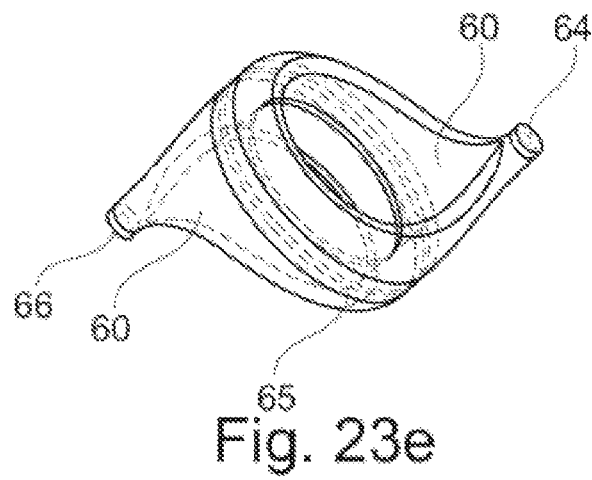
Fig. 23e
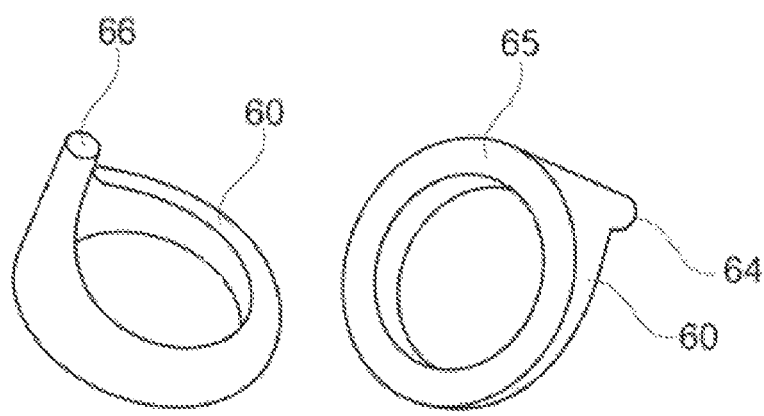
Fig. 23f
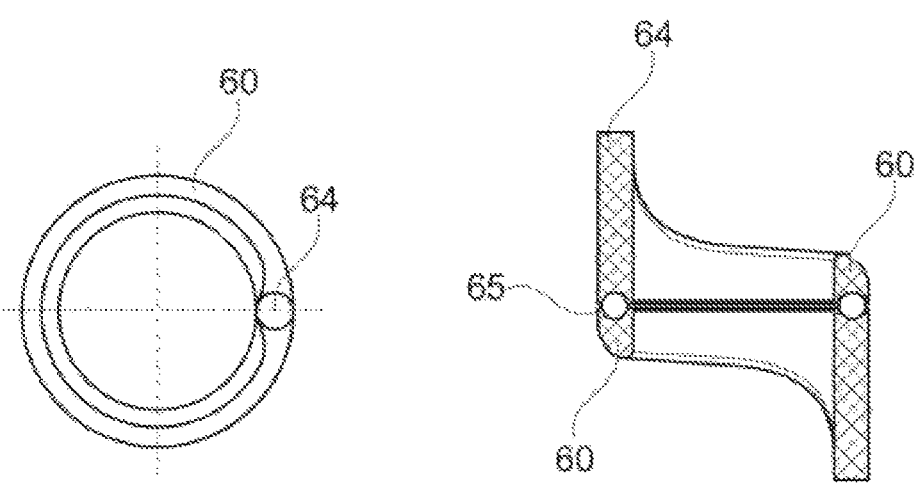
Fig. 23g
Fig. 23h

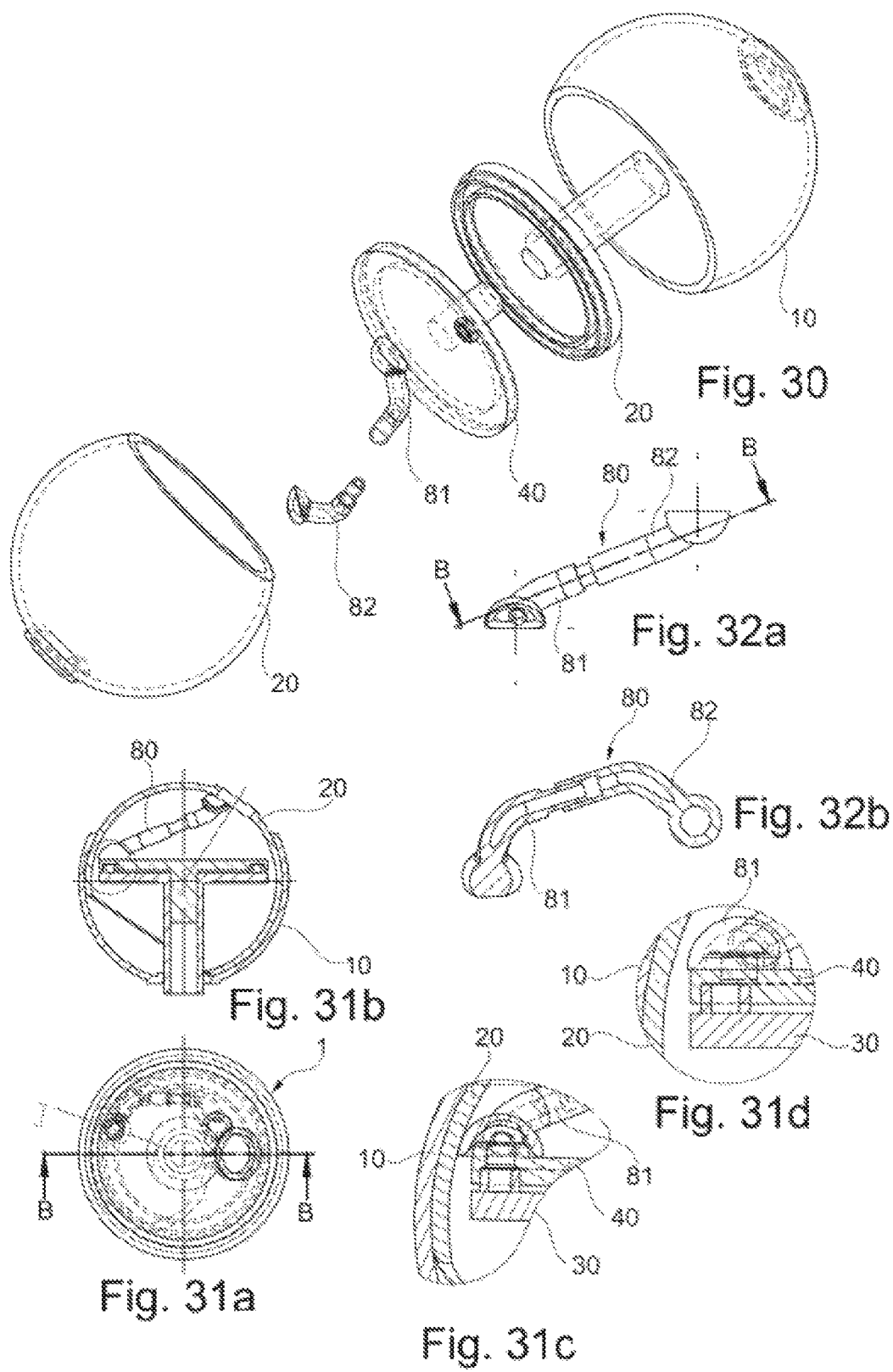

DEVICE FOR MECHANICAL CONNECTION AND FOR OPTICAL AND/OR ELECTRICAL AND/OR FLUID TRANSMISSION BETWEEN A FIRST ELEMENT AND A SECOND ELEMENT

FIELD OF THE INVENTION

The present invention relates to the field of the transmission of movement, in particular that of ball joint links between a first element and a second element.

BACKGROUND OF THE INVENTION

In U.S. Pat. No. 294,851, part B surrounds the spherical part only partially, and only on the side opposite the ferrule C. Thus, this patent does not disclose a configuration whereby a second connection part designed to be fixed to a second element is arranged at least in part between a first connection part and a first joining member.

In the fields of robots, home automation and industry, there is a need for an efficient mechanical link that also allows a transmission of data.

There is also a need to allow synchronization in the transmission of data as a function of the movement of the ball joint link.

BRIEF SUMMARY OF THE INVENTION

A subject of the invention, according to a first of the aspects thereof, is thus a device for achieving a mechanical link and optical and/or electrical and/or fluidic transmission between a first element and a second element, comprising:

a first connection part designed to be fixed to the first element, a first joining member connected optically and/or electrically and/or in fluidic communication with the first element and mounted on the first connection part, a second connection part designed to be fixed to the second element, and arranged at least in part between the first connection part and the first joining member and defining a ball joint link between the first and second elements, and a second joining member connected optically and/or electrically and/or in fluidic communication with the second element, arranged in the second connection part, the first and second joining members being configured such as to allow an optical and/or electrical and/or fluidic transmission from one to the other.

Thus, the device according to the invention allows a transmission that is at once mechanical, optical, electrical and fluidic between the first and second elements.

The optical, electric and fluidic contacts may be synchronized with the mechanical transmission of movement.

The first joining member and the second joining member may both be arranged in the second connection part.

Mechanical Link

The second connection part is, in one embodiment, movable relative to the first connection part through three degrees of freedom.

The second connection part may be movable in rotation about an axis Z of the first connection part through an angle greater than 180°, better still greater than 210°, and particularly 360°. In one embodiment, the second connection part may be entirely free in rotation about the axis Z of the first connection part. The axis Z may be a central axis for the first connection part, notably an axis of symmetry thereof.

The second connection part may be movable in rotation about at least one axis X perpendicular to the axis Z through a maximum angle strictly greater than 0°, even better greater than 10°, or even greater than 20°, or even about a plurality of axes X perpendicular to the axis Z. The axes X may form a plane P perpendicular to the axis Z. The maximum angle may, for example, be of the order of 22.5°, but the configuration of the device could be modified so that this maximum angle is different without departing from the context of the present invention. This maximum angle is, furthermore, called the deflection angle for the device.

In one embodiment, the second connection part may be movable in rotation about a plurality of axes X all perpendicular to the axis Z through an angle strictly greater than 0°, even better greater than 10°, or even greater than 20°, or even an infinity of axes X forming the plane P perpendicular to the axis Z.

The first connection part may comprise a concave portion and the second connection part may have an opposite exterior concavity. The second connection part may thus be in part arranged in the first connection part.

The concave portion of the first connection part may have an at least partially spherical interior surface and the second connection part may comprise an at least partially spherical exterior surface.

The interior surface of the first connection part may have an annular general form, which may form a portion of a first sphere extending to 360° about a central axis Z and extend in an angular portion between two angles $\alpha$ and $\beta$ measured from the center of the first sphere perpendicularly relative to the central axis Z.

The angle $\alpha$ may be between 1° and 45°, better still between 2° and 35°, or even between 3° and 25°. The angle $\beta$ may be between 10 and 90°, 90° value excluded, better still between 15° and 75°, or even between 20° and 65°.

The first sphere may have a radius $R_1$ of between 6 and 500 mm, better still between 10 and 250 mm, being, for example, of the order of 20 mm.

The exterior surface of the second connection part may have an annular general form, which may form a sphere second portion extending to 360° about a central axis Y of the second connection part and extend in an angular portion between two angles $\gamma$ and $\delta$ measured from the center of the second sphere perpendicularly relative to the central axis Y.

The angle $\gamma$ may be between 10° and 80°, better still between 20° and 70°, or even between 30° and 60°. The angle $\delta$ may be between −60° and 60°, better still between −50° and 50°, or even between −40° and 40°.

The second sphere may have a radius $R_2$ of between 6 and 500 mm, better still between 10 and 250 mm, being, for example, of the order of 20 mm.

The first and second spheres may have a common center. Their radii may differ by a few hundreds of a millimeter. For example, $R_1$-$R_2$ is between 0.01 and 2 mm, or even between 0.02 and 1.5 mm, better still between 0.03 and 1 mm.

The first joining member may comprise a convex portion and the second connection part may have an opposite interior concavity. The first joining member may thus be in part arranged in the second connection part.

The second connection part may have an at least partially spherical interior surface and the first joining member may comprise an at least partially spherical exterior surface.

The interior surface of the second connection part may have an annular general form, which may form a portion of a third sphere extending to 360° about the central axis Y and extend in an angular portion between the two angles $\gamma$ and $\delta$ described above. The third sphere may have a radius $R_3$ of between 4 and 480 mm, better still between 10 and 300 mm, being, for example, of the order of 18 mm.

The exterior surface of the first joining member may have an annular general form, which may form a fourth sphere portion extending to 360° about the central axis Z and extend in an angular portion between the two angles α and β described above. The fourth sphere may have a radius $R_4$ of between 4 and 480 mm, better still between 10 and 300 mm, being, for example, of the order of 18 mm.

The third and fourth spheres may have a common center. Their radii may differ by a few tenths of a millimeter. For example, $R_3$-$R_4$ is between 0.01 and 2 mm, or even between 0.02 and 1.5 mm, better still between 0.03 and 1 mm. Such a configuration makes it possible to ensure that the second connection part is able to rotate between the first connection part and the first joining member.

The second connection part may comprise an interior surface having a radial groove extending over a part at least of the height of the interior surface. The radial groove extends, in one embodiment, in a plane containing the central axis Y of the second connection part.

The second joining member may comprise a rotary plate equipped with a stud designed to be received in the radial groove of the second connection part. The rotary plate may be of discoid general form, extending in a substantially planar manner in the above-mentioned plane P. It may be movable in rotation about the above-mentioned axis Z of the first connection part through an angle greater than 180°, even better greater than 210°, notably 360°.

The rotational movement of the rotary plate about the axis Z may be transmitted to the second connection part, and vice versa, by virtue of the interaction of the stud in the radial groove. Furthermore, the rotary plate remains parallel to the plane P, the stud of the rotary plate moving in the radial groove upon movement of the second connection part about the axes X and the plane P.

The device according to the invention may be used as a cardan joint between two non-aligned rotating shafts. Such a joint also allows leaktight internal electrical and/or optical joins.

In a variant embodiment, the second connection part may lack the above-mentioned radial groove and the second joining member may lack the above-mentioned stud.

The second connection part and the second joining member may be connected together by a synchronization connecting rod that makes it possible to ensure the transmission of the rotational movement of the rotary plate of the second joining member about the axis Z to the second connection part, and vice versa.

The connecting rod may be fixed by a ball joint link, on the one hand, to the second connection part and, on the other, to the second joining member. The ball joint join may be leaktight, such as, also, to allow a fluidic link in the connecting rod, as will be seen below. The connecting rod may be hollow. In this case, it may comprise a first connecting rod part and a second connecting rod part connected in the form of a translational join, limited in terms of travel and leaktight, such as to allow the fluidic link in the connecting rod.

Electric Transmission

The two first and second joining members may each comprise an electric current transmission collector. Each of the transmission collectors may comprise at least two electric transmission tracks. One of the tracks allows mass transmission and the other electric current transmission.

Each of the collectors may, for example, comprise between 2 and 20 tracks, or even between 4 and 12 tracks, for example 6 tracks or 8 tracks.

The transmission collectors may be configured such as to make it possible to attain a high data transmission speed.

In one embodiment, the tracks of each of the two transmission collectors may be circular and concentric. In this case, each of the two transmission collectors may have a planar, discoidal general form. The two transmission collectors may comprise the same number of tracks with the same design. They are symmetrical with one another relative to the plane P. The two transmission collectors are movable in rotation relative to one other about the axis Z, but fixed relative to the plane P. They may be of discoid general form and extend in a substantially planar manner parallel to one another in the plane P.

The second transmission collector is, in one embodiment, fixed to the rotary plate.

The device may comprise a plurality of balls arranged between the first transmission collector of the first joining member and the second transmission collector of the second joining member so as to allow electric transmission between the first and second collectors.

The balls comprise at least an electrically conducting coating. They may, in particular, be made from an electrically conducting material, for example stainless steel or brass or copper, this not being a limiting list. The use of balls makes it possible advantageously to reduce or even to eliminate friction. The device may comprise between 6 and 200 balls, better still between 8 and 120 balls, or even between 12 and 36 balls. Each track of a collector may be in contact with between 3 and 36 balls, better still between 5 and 8 balls, or even between 9 and 18 balls.

The balls may, in particular, be retained in a holding component. The holding component may be in the form of a plaque of discoid general shape that is pierced with orifices in which the balls may be arranged. In one embodiment, the holding component is fixed to the second joining member, for example by means of snap-fitting.

In a variant embodiment, the transmission collectors and the balls could be arranged in a tubular manner rather than in a planar manner.

A further subject of the invention, independently or in combination with the preceding object, according to another of the aspects thereof, is a device for achieving a mechanical and link optical and/or electrical and/or fluidic transmission between a first element and a second element, comprising:

a first connection part designed to be fixed to the first element, a first joining member connected optically and/or electrically and/or in fluidic communication with the first element and mounted on the first connection part, a second connection part designed to be fixed to the second element, and arranged at least in part between the first connection part and the first joining member and possibly defining a ball joint link between the first and second elements, and a second joining member connected optically and/or electrically and/or in fluidic communication with the second element, arranged in the second connection part, the first and second joining members possibly being configured such as to allow an optical and/or electrical and/or fluidic transmission from one to the other, the two first and second joining members each comprising an electric current transmission collector, a plurality of balls being arranged between the first transmission collector of the first joining member and the second transmission collector of the second joining member such as to allow electric transmission between the first and second collectors.

In a variant embodiment, electric transmission between the two transmission collectors could be effected without balls, but, for example, by means of leaves having a sprung effect with, in particular, one leaf per track, or, alternatively, by means of brushes.

The first connection part may comprise a first receiving electrical connector that receives electrical data from the first element.

The first receiving electrical connector may be of discoid general form and extend, in a substantially planar manner, in the plane P.

The second connection part may comprise a second receiving electrical connector that receives electrical data from the second element.

The second receiving electrical connector may comprise electrical flexible connectors connecting it to the second transmission connector. The second receiving electrical connector may be of discoid general form and extend, in a substantially planar manner, in a plane Q perpendicular to the central axis Y.

An electrical track may be configured such as to allow the passage of a current of the order of a few amps, for example between 0.5 and 10 A, better still between 1 and 6 A, or even between 1.5 and 4 A, being, for example, of the order of 2 A.

Optical Transmission

The device may be configured such as to allow optical transmission between the first and second elements.

The device may, to that end, comprise an optical ring arranged on one of the joining members, it being possible for the optical ring to have a surface state allowing the same intensity and the same light speed in rotation to be maintained when one of the joining members is in rotation relative to the other.

To that end, the optical ring may have undergone an appropriate degraded evolutive surface treatment, with a variation in opacity. Such a configuration makes it possible to overcome reception periodicity. The optical treatment of the optical ring may be chosen such as to obtain a continuous output signal. In a variant, an electronic recording of this curve may be made with a view to smoothing the output signal.

The state of the surface, the form thereof and the density of the material of the optical ring are chosen such as to allow the transmission of light with sufficient synchronization.

The optical ring may be of annular general form and extend, in a substantially planar manner, parallel to the plane P.

In one embodiment, the device may comprise two optical rings arranged one facing the other, parallel to the plane P, one on each of the two joining members.

In one embodiment, the optical rings may have a form configured such as to allow the arrival of light in the ring via a disk-form inlet, the light then being distributed over the entire surface of the ring having an annular form. Such a configuration of the optical rings then allows optical transmission toward the second ring of annular form, then the reconcentration of the light toward a disk-form outlet. The disk-form inlet and outlet may be relatively isolated relative to the annular transmission surface between the two rings. The light bundle between the first and second rings may thus be of annular cross section. A given optical ring may comprise one or more inlet(s) and/or outlet(s), in particular of disk form, allowing the arrival and departure of the light.

Transmission may be entirely effected only optically, that is to say light may be transmitted directly from a first optical fiber bringing it from the first element, then across the optical ring and then transmitted directly to a second optical fiber bringing it to the second element, or vice versa. The first and second optical fibers may be flexible such as not to impede the relative rotation of the joining members. In one embodiment, one may be fixed and the other may be flexible.

In a variant, transmission may be effected both optically and electrically. In this case, the device may comprise at least one emitter and an optical receiver for the optical-electrical or electrical-optical or electrical-optical-electrical or even optical-electronic-optical transmission between the two transmission collectors.

In one embodiment, each transmission collector may comprise an optical emitter-receiver, which may each be arranged facing the above-mentioned optical ring.

Fluidic Transmission

The device may be configured such as to allow fluidic transmission between the first and second elements. The transmitted fluid may be gaseous, for example air, or liquid, for example water or oil.

The fluid may circulate in a single location or, in a variant, in two different locations. The fluid may circulate, for example, at the center of the device, the fluidic circulation then being axial, or on the side, the fluidic circulation then being eccentric.

In the case of an axial fluidic circulation, the device may comprise a hollow central shaft allowing the passage of the fluid.

In the case of a peripheral fluidic circulation, the device may comprise an eccentric fluid passage equipped with appropriate leaktight seals.

In all cases, the fluidic join is configured so as to be leaktight.

The device may comprise a connecting rod fixed by a ball joint link to the second connection part, on the one hand, and on the other to the second joining member and, as mentioned above, configured such as to allow the fluidic link. The connecting rod is hollow, comprising a first hollow connecting rod part and a second hollow connecting rod part connected in the form of a translational join, limited in terms of travel, and leaktight, such as to allow the fluid to flow through the connecting rod. The first connecting rod part may be configured such as to slide in part in the second connecting rod part.

The device according to the invention may be configured such as to be sufficiently leaktight. "Sufficient leaktightness" is understood to mean that leaktightness must be such that the electrical and/or optical connections may occur in the device in a satisfactory manner.

The device according to the invention may even have a leaktightness that allows a fluidic transmission, such as to provide fluidic communication between the first and second elements, as described above.

The leaktightness of the device may, for example, have a sufficient protection index number, for example IP67.

The first and second connection parts are configured such as to ensure the internal leaktightness of the device. The device may comprise a leaktight seal arranged between the first and second connection points. It may be made from a thermoplastic material, for example EPDM or PTFE. The hardness thereof may, for example, be of the order of 30 to 70 Shore A or 40 to 60 Shore D.

At least one of the first and second connection parts, or even both, may be made from a thermoplastic material, for example POM (polyoxymethylene).

The electrical and optical contacts are preferably synchronized at the device inlet and outlet.

The device may have a circular general form. It may have a larger transverse dimension, in particular a diameter, between, for example, 50 and 1000 mm, better still between 60 and 800 mm, or even between 80 and 500 mm, better still between 100 and 140 mm, being, for example, of the order of 120 mm.

The device may, furthermore, comprise one or more sensors, for example one or more ultrasonic sensors, or even one or more infrared sensors. Such sensors may make it possible to play an anti-collision role or, alternatively, a spatial referencing role.

Assembly

A further subject of the invention is an assembly comprising a plurality of devices such as described above, coupled to one another, one of the first connection part or of the second connection part of a first device forming the first element for an adjacent second device.

Two adjacent devices may be connected together, each via their first connection part, or, in a variant, each via their second connection part, or, alternatively, in a variant, one via its first connection part and the other via its second connection part. In other words, when the assembly is assembled, the devices may be arranged in any direction whatsoever.

Such an assembly makes it possible to increase the possible deflection angle, insofar as the deflection angles of each device are added to one another.

Two adjacent devices may be coupled together by an assembly ring so as to ensure the holding of the two consecutive connection parts of both devices.

Each of the first and second connection parts may comprise snap-fit lugs to allow the fixing of one connection part to another.

The snap-fit lugs may all be identical, unless provision is made for a locator system to ensure the satisfactory orientation of the connection parts relative to the axis Z. All the snap-fit lugs may be of identical form, except for one, for that purpose.

The assembly may further comprise one or more accessories coupled to a device. These may be mechanical or electrical accessories such as, for example, an Ethernet connection, a USB connection, an optical fiber or a motorized telescopic arm, this not being a limiting list.

An assembly and a device according to the invention may be used in all technical fields in which an electrical and/or optical and/or fluidic articulated transmission device without rotational restriction may be useful, and particularly in the industrial field for a production or assembly line, in the robotics field for an articulated arm, or even in the field of domestic automation for transferring data and lighting, this not being a limiting list.

DESCRIPTION OF THE FIGURES

Other features and advantages of the present invention will become apparent upon reading the following detailed description of exemplary embodiments that do not limit the invention, and by examining the appended drawing, in which:

FIG. 18 is a schematic, partial view in transverse section along XVIII-XVIII of the device of FIGS. 16a, 16b, 17a and 17b.

FIG. 23a is a view

FIG. 23b is a cross section thereof along B-B,

FIGS. 23c and 23d are views of details of FIG. 23b,

FIG. 23e is a perspective view of a variant embodiment of optical rings,

FIG. 23f is an expanded view thereof,

FIG. 23g is a top view thereof,

FIG. 23h is a view thereof in longitudinal section,

FIG. 24 is a schematic, partial perspective view of an assembly according to the invention, FIG. 30 is a perspective view of a variant embodiment, FIG. 31a is a top view thereof, FIG. 31b is a view thereof in transverse section along B-B, FIGS. 31c and 31d are views of details thereof, FIG. 32a is a perspective view of the connecting rod of FIG. 30, FIG. 32b is a view thereof in transverse section along B-B.

DESCRIPTION OF EXAMPLE EMBODIMENTS

Figure 1:
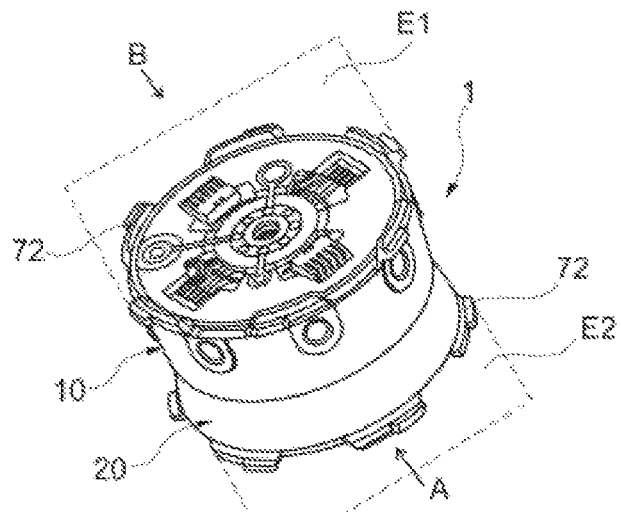
FIG. 1 is a perspective, schematic, partial view of a device according to the invention.

FIGS. 1 to 19 illustrate a device 1 for achieving a mechanical link and for optical and electrical transmission and between a first element E1 and a second element E2, which are indicated in broken lines in FIG. 1.

The device comprises a first connection part 10 designed to be fixed to the first element E1 and a second connection part 20 designed to be fixed to the second element E2.

Figure 2:
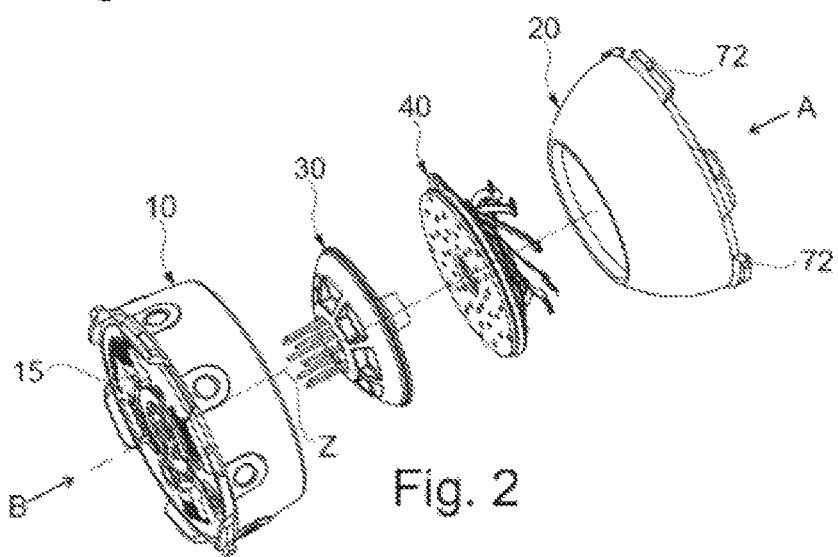
FIG. 2 is an expanded view thereof.

The device further comprises a first joining member 30 connected optically and electrically to the first element and mounted on the first connection part, as may be seen in FIG. 2, and a second joining member 40 connected optically and electrically to the second element E2, arranged in the second connection part 20.

Figure 4:
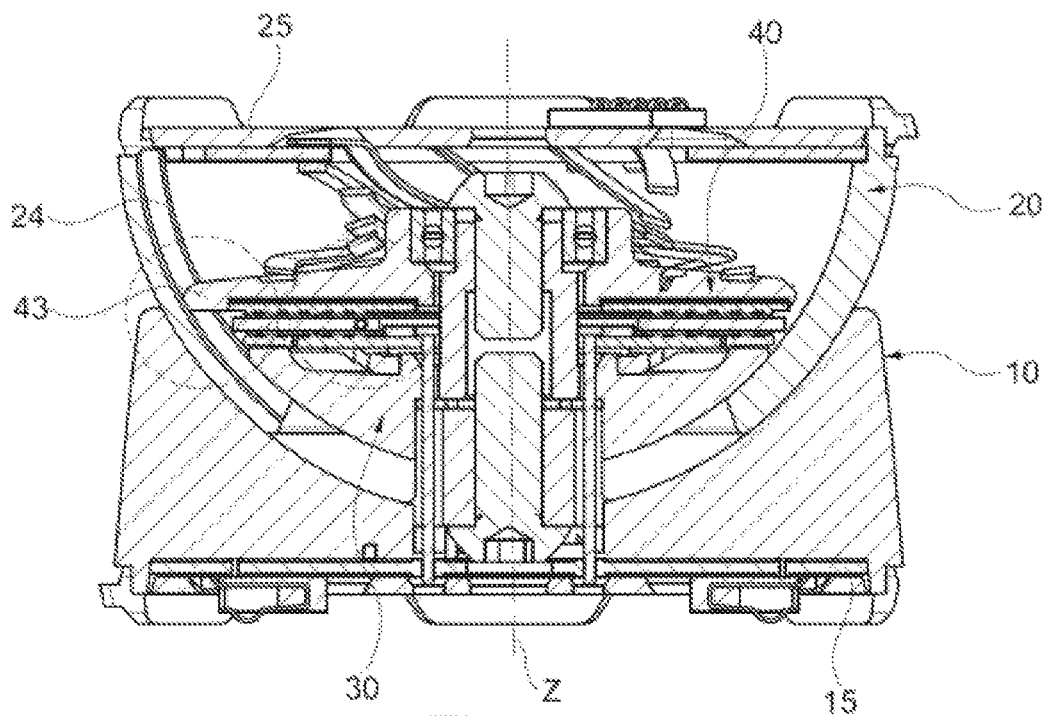
FIG. 4 is a schematic, partial view in transverse section on IV-IV of the device of FIGS. 1, 2, 3a and 3b, FIGS. 4a to 4c are views of details of FIG. 4.
Figure 4B:
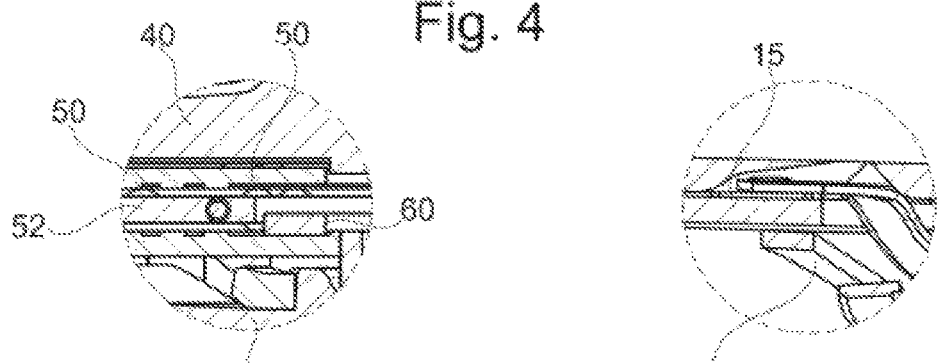
Figure 4C:
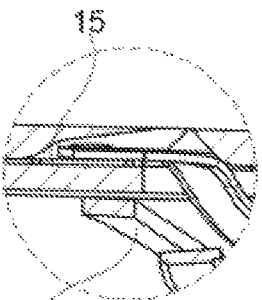
Figure 4A:
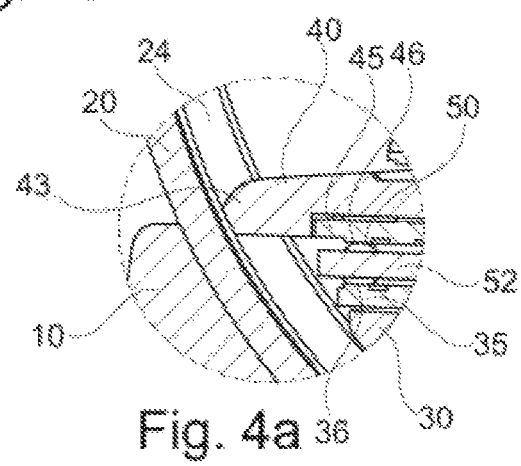
Figure 5:
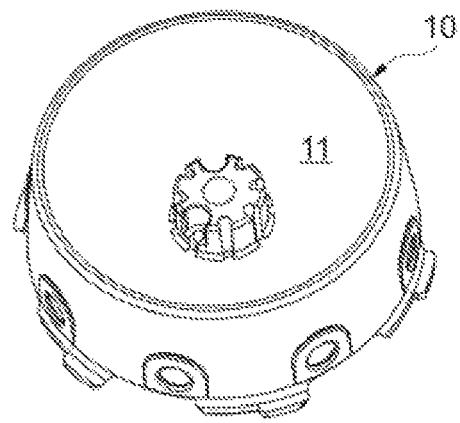
FIG. 5 is a schematic, partial perspective view of the first connection part of the device of FIGS. 1 to 4.

The second connection part 20 is arranged at least in part between the first connection part 10 and the first joining member 30, as may be seen in FIG. 4. The two connection parts 10 and 20 define a ball joint link between the first and second elements E1 and E2, by virtue of their specific form, which will be described below.

Furthermore, the first and second joining members 30 and 40 are configured such as to allow optical and electrical transmission from one to the other so that the device 1 allows a transmission that is at once mechanical, optical and electrical between the first and second elements E1 and E2. The first joining member and the second joining member are both arranged in the second connection part 20.

A description will now be given in further detail of the configuration of the connection parts.

The second connection part 20 is movable relative to the first connection part 10 through three degrees of freedom. To that end, the second connection part 20 is movable in rotation about an axis Z of the first connection part 10 through an angle of 360°. In other words, the second connection part 20 is entirely free in rotation about the axis Z of the first connection part 10. The axis Z is a central axis for the first connection part 10.

Furthermore, the second connection part is movable in rotation about all the axes X perpendicular to the axis Z through a maximum deflection angle of the order of 22.5°. The axes X form a plane P perpendicular to the axis Z, which is the plane of FIGS. 3a, 3b and 7.

Figure 7:
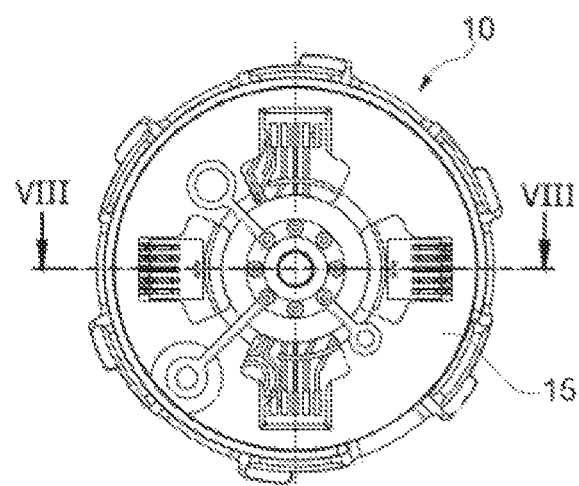
FIG. 7 is a view along the arrow VII of FIGS. 5 and 6.
Figure 8:
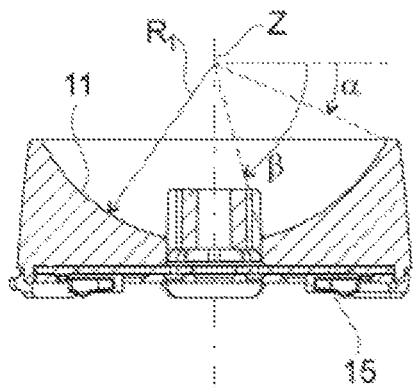
FIG. 8 is a view thereof in transverse section along VIII-VIII.

As illustrated in FIGS. 5 to 8, the first connection part 10 comprises a concave portion 11. This concave portion 11 has an at least partially spherical interior surface. The interior surface of the first connection part has an annular general form, which forms a portion of a first sphere extending to 360° about the central axis Z and extends in an angular portion between two angles α and β measured from the center of the first sphere perpendicularly relative to the central axis Z, as illustrated in FIG. 8. The angle α is, for example, of the order of 12.5°. The angle β is, for example, of the order of 25°. The first sphere has a radius $R_1$, for example of the order of 20 mm.

Figure 11:
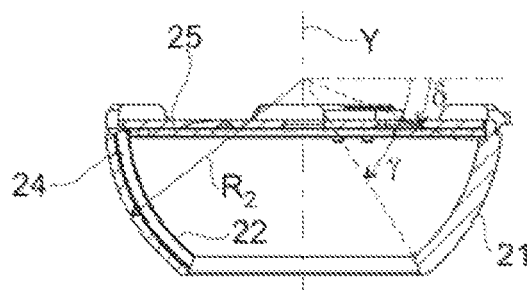
FIG. 11 is a view thereof in transverse section along XI-XI.
Figure 10:
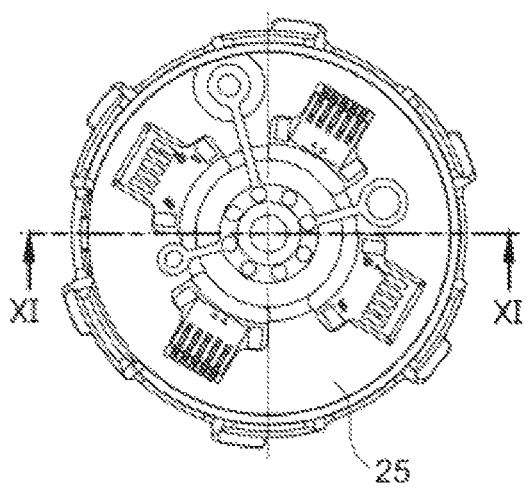
FIG. 10 is a view along the arrow X of FIG. 9.
Figure 9:
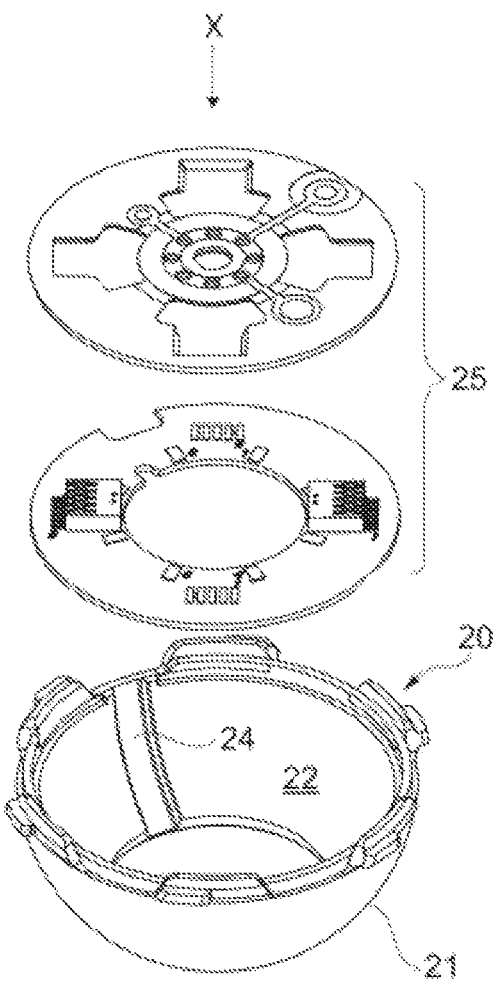
FIG. 9 is a schematic, partial expanded view thereof, of the second connection part of the device of FIGS. 1 to 4.
Figure 14B:
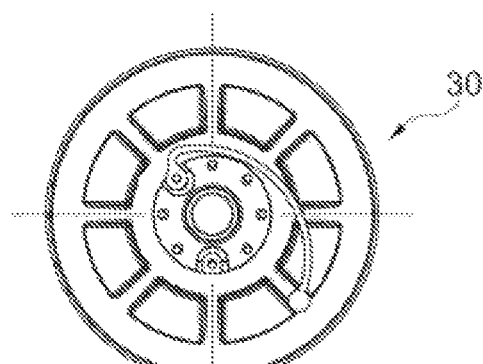
FIGS. 14a and 14b are views along the arrows A and B of FIGS. 12 and 13.

As illustrated in FIGS. 9 to 11, the second connection part 20 has an exterior concavity opposite the concavity of the concave portion 11. The second connection part is thus partially arranged in the first connection part. The second connection part 20 comprises an at least partially spherical exterior surface 21, which has an annular general form, and which forms a second sphere portion extending to 360° about a central axis Y of the second connection part 20 and extends in an angular portion between two angles γ and δ measured from the center of the second sphere perpendicularly relative to the central axis Y, as may be seen in FIG. 11. The angle γ is, for example, of the order of 50°. The angle δ is, for example, of the order of 5°. The second sphere has a radius $R_2$, for example of the order of 20 mm.

Furthermore, as illustrated in FIGS. 12 to 15, the first joining member 30 comprises a convex portion 31, which has the form of a partially spherical exterior surface. The exterior surface of the first joining member 30 has an annular general form, which forms a fourth sphere portion extending to 360° about the central axis Z and extends in an angular portion between the two angles α and β described above. The fourth sphere has a radius $R_4$ of the order of 18 mm.

The second connection part 20 has an opposite interior concavity, which has the form of a partially spherical interior surface 22. The first joining member may thus be partially arranged in the second connection part, as may be seen in FIG. 4. The interior surface of the second connection part 20 has an annular general form, which forms a portion of a third sphere extending to 360° about the central axis Y and extends in an angular portion between the angles γ and δ described above. The third sphere has a radius $R_3$ of the order of 18 mm.

Such a configuration makes it possible to ensure that the second connection part 20 is able to rotate between the first connection part 10 and the first joining member 30.

Furthermore, as may be seen in FIG. 9, the second connection part comprises an interior surface 22 having a radial groove 24 extending over a part at least of the height of the interior surface 22. The radial groove 24 extends in a plane containing the central axis Y of the second connection part, as may be seen in FIG. 11.

Furthermore, the second joining member comprises, as illustrated in FIGS. 16a to 19, a rotary plate 42 equipped with a stud 43 designed to be received in the radial groove 24 of the second connection part 20. The rotary plate 42 is of discoid general form, extending, in a substantially planar manner, along the above-mentioned plane P. It is movable in rotation about the above-mentioned axis Z of the first connection part 10 through an angle of 360°.

The rotational movement of the rotary plate about the axis Z may be transmitted to the second connection part, and vice versa, by virtue of the interaction of the stud 43 in the radial groove 24. Moreover, the rotary plate remains parallel to the plane P, the stud of the rotary plate moving in the radial groove upon movement of the second connection part about the axes X and the plane P.

The device is configured such as to allow electrical transmission between the first and second elements E1 and E2. To that end, the first and second joining members 30 and 40 each comprise an electrical current transmission collector 35 and 45, respectively. The second transmission collector 46 is fixed to the rotary plate 45, as may be seen in FIG. 16a. Each of the two transmission collectors 36, 46 has a planar, discoid general form.

Figure 12:
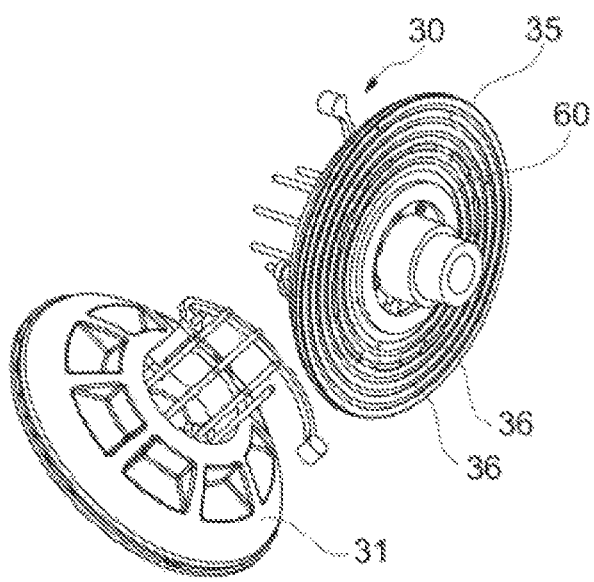
FIG. 12 is a schematic, partial perspective view of the first joining member of the device of FIGS. 1 to 4.
Figure 15:
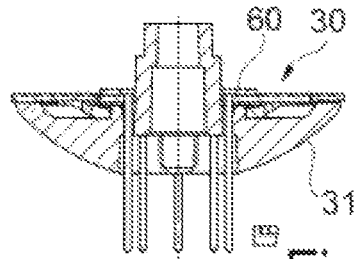
FIG. 15 is a schematic, partial view in transverse section along XV-XV of the device of FIGS. 12, 13, 14a and 14b, FIGS. 16a and 16b are schematic, partial perspective views of the second joining member of the device of FIGS. 1 to 4, FIGS. 17a and 17b are views along the arrows A and B of FIGS. 16a and 16b.
Figure 14A:
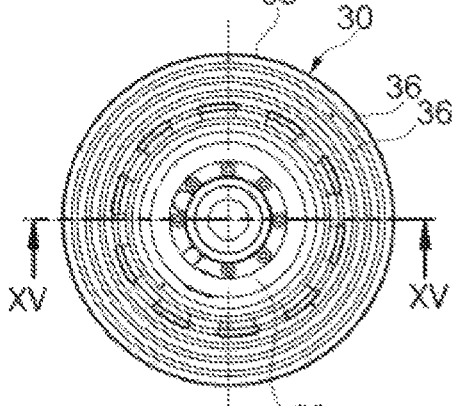
Figure 13:
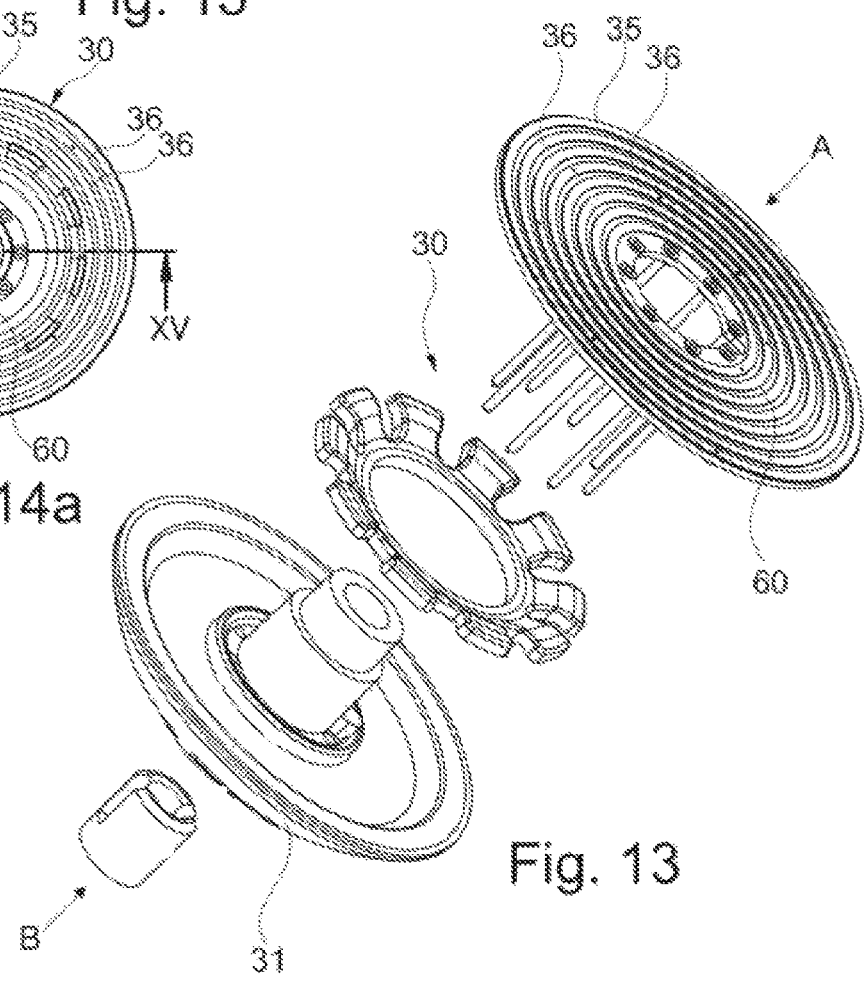
FIG. 13 is an expanded view thereof.

Each of the transmission collectors 35, 45 comprise six tracks 36 and 46, respectively, for electrical transmission, as illustrated in FIGS. 12, 13, 14a, on the one hand, and 22a on the other. One of the tracks allows the transmission of mass and the others of electrical current. The tracks 36 and 46 of each of the two transmission collectors 35 and 45 are circular and concentric.

The two transmission collectors 35, 45 comprise the same number of tracks with the same design. They are symmetrical with one another relative to the plane P. The two transmission collectors are movable in rotation relative to one another about the axis Z, but fixed relative to the plane P. They are of discoid general form and extend, in a substantially planar manner, parallel to one another along the plane P.

Figure 19:
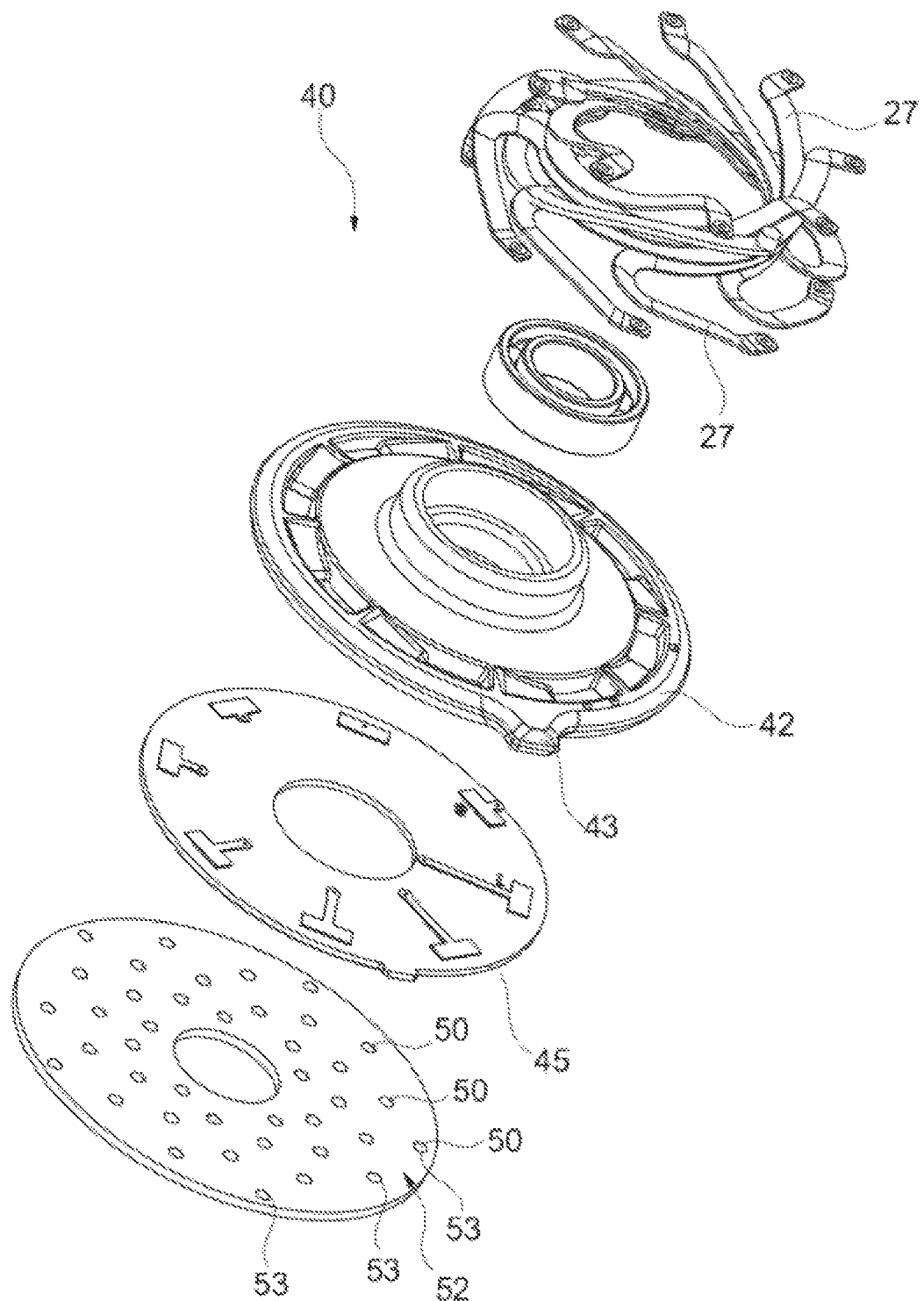
FIG. 19 is an expanded view thereof.

With a view to allowing electrical transmission between the first and second collectors 35, 45, the device comprises a plurality of balls 50 arranged between the first transmission collector 35 of the first joining member 30 and the second transmission collector 45 of the second joining member 40, which are retained in a holding component 52, as illustrated in FIGS. 16a and 19. The balls 50 comprise at least an electrically coating. They may, in particular, be made from an electrically conducting material, for example stainless steel. The holding component 52 has the form of a plate of discoid general form, which is pierced with orifices 53 in which the balls 50 are arranged.

Figure 3A:
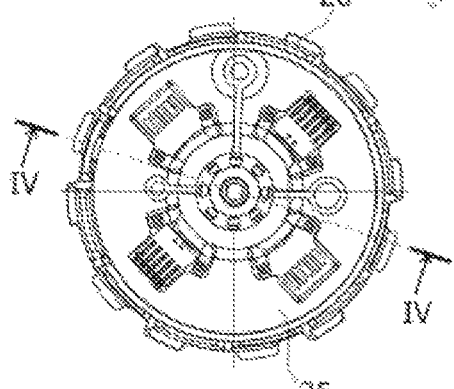
FIGS. 3a and 3b are views along the arrows A and B of FIGS. 1 and 2.
Figure 3B:
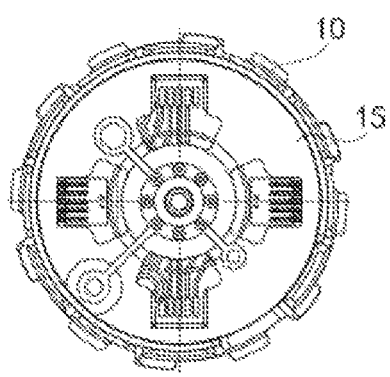
Figure 6:
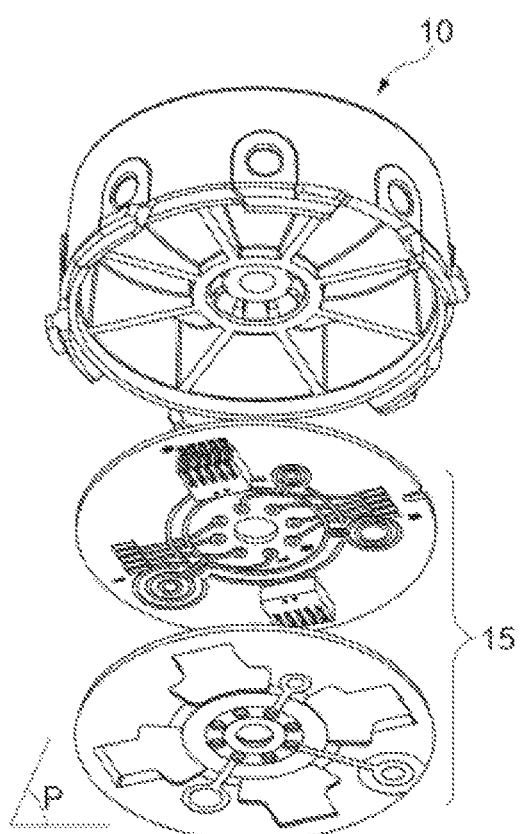
FIG. 6 is an expanded view thereof.

Moreover, the first connection part 10 comprises a first receiving electrical connector 15 that receives electrical data from the first element E1, visible in FIGS. 3b, 6 and 7. The first receiving electrical connector 15 is of discoid general form and extends, in a substantially planar manner, along the plane P.

Similarly, the second connection part 20 comprises a second receiving electrical connector 25 that receives electrical data from the second element E2. The second receiving electrical connector 25 is of discoid general form and extends, in a substantially planar manner, according a plane Q perpendicular to the central axis Y. The plane Q is the plane of FIGS. 17a and 17b.

The second receiving electrical connector 25 comprises flexible electrical connectors 27 connecting it to the second transmission connector 45.

The device is also configured such as to allow optical transmission between the first and second elements E1 and E2. The device comprises to that end an optical ring 60 arranged on one of the joining members 30 or 40, that is to say on the first joining member 30, as illustrated in greater detail in FIGS. 20 to 23d.

Figure 20:
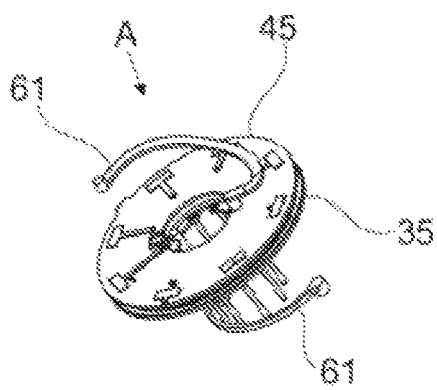
FIG. 20 is a schematic, partial perspective view of the optical transmission of the device of FIGS. 1 to 4.
Figure 20A:
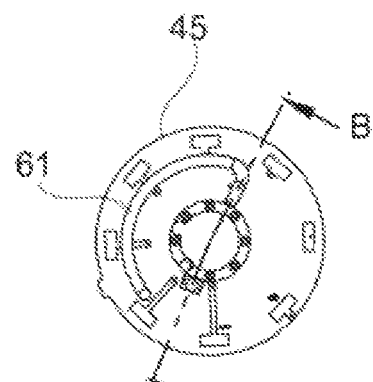
FIG. 20a is a view thereof along the arrow A and FIG. 20b is a transverse section thereof along B-B.
Figure 20B:
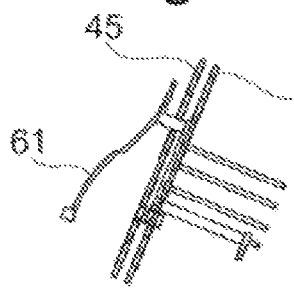
Figure 20C:
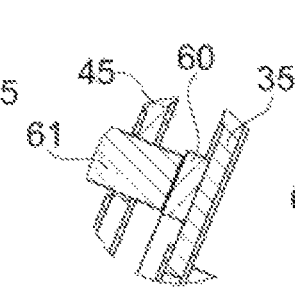
FIGS. 20c and 20d are views of details of FIG. 20b, FIGS. 21a and 21b are top and bottom perspective views of one of the joining members.
Figure 20D:
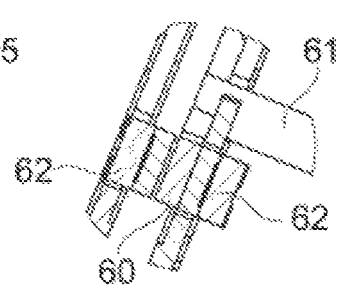
Figure 21A:
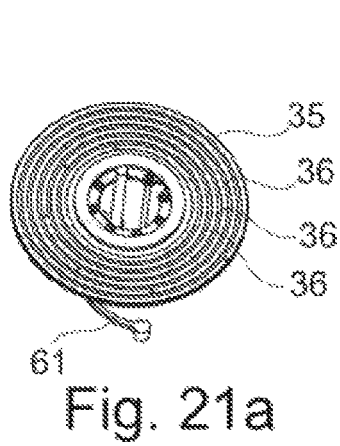
Figure 21B:
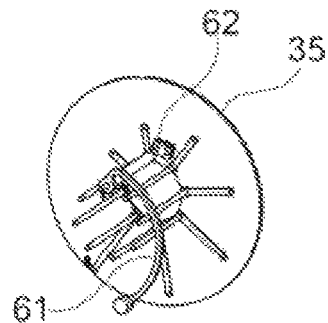
Figure 22A:
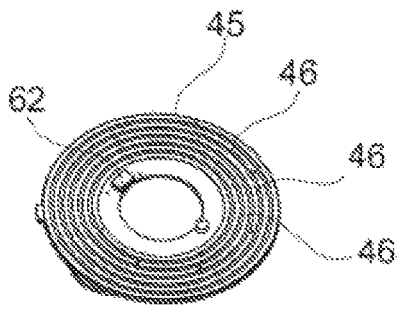
FIGS. 22a and 22b are top and bottom perspective views of the other of the joining members.
Figure 22B:
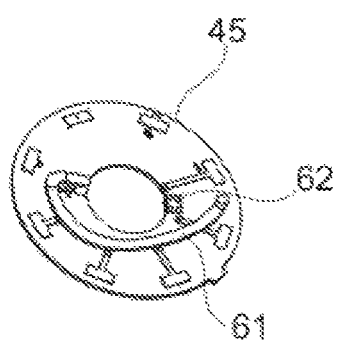
Figure 25:
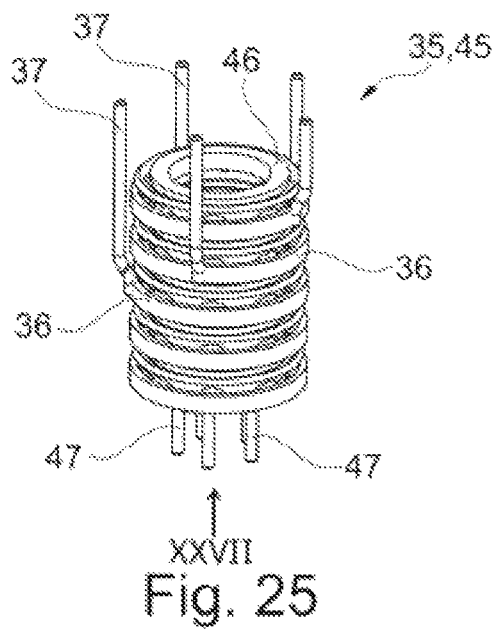
FIG. 25 is a schematic, partial perspective view of a variant embodiment.
Figure 28:
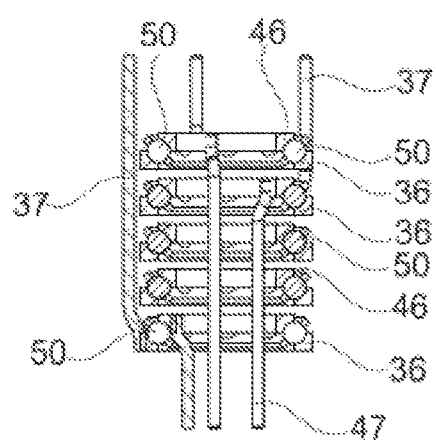
FIG. 28 is a view thereof in transverse section along XXVIII-XXVIII.
Figure 27:
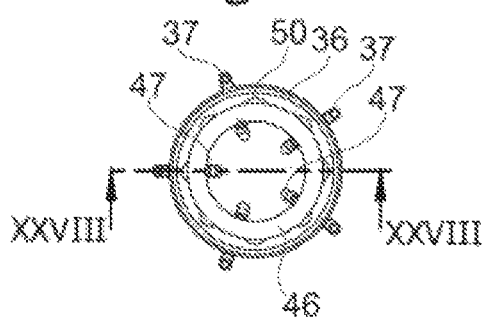
FIG. 27 is a view along the arrow XXVII of FIGS. 25 and 26.
Figure 26:
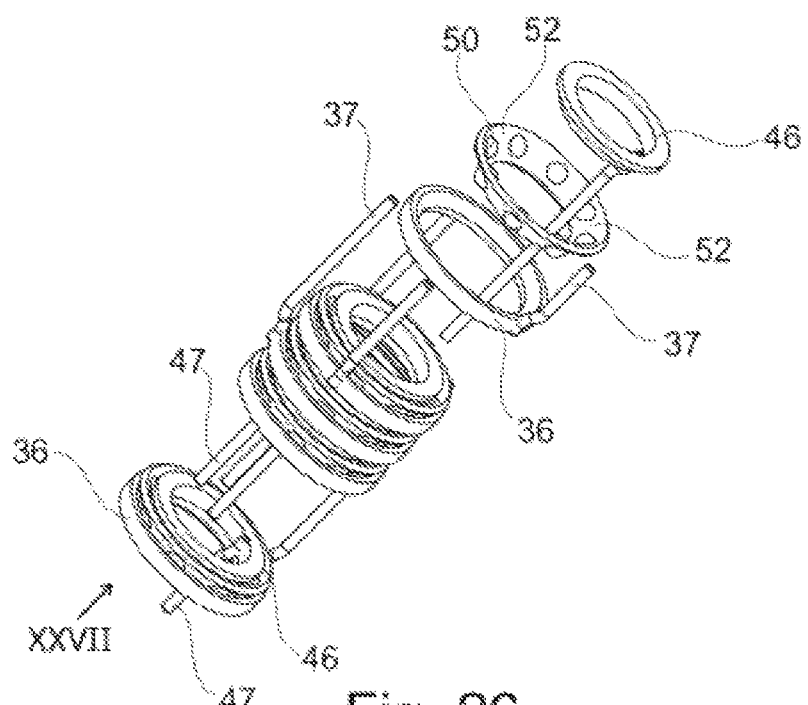
FIG. 26 is an expanded view thereof.

The optical ring 60 is of annular general form and extends, in a substantially planar manner, parallel to the plane P. Light is conveyed toward or from the optical ring 60 by two optical fibers 61, as illustrated in FIG. 20, for example.

The device further comprises two optical transceivers 62 and 63, each on one of the transmission collectors, which are each arranged facing the above-mentioned optical ring 60.

In a variant embodiment illustrated in FIGS. 23e to 23h, optical transmission may be achieved by means of two optical rings 60 arranged facing one another. Each optical ring 60 has a form configured such as to allow the arrival of light in the ring via an inlet 64 of disk form, the light then being distributed over the entire surface 65 of the ring having an annular form. There is then optical transmission toward the second ring 60 of annular form, then reconcentration of the light toward an outlet 66 of disk form.

Each optical ring 60 has undergone an external antidispersion surface treatment such as to permit internal radiation. All the exterior surfaces of the optical rings 60, aside from inlet 64 and outlet 66, may be coated with an opaque diffusing material, for example of aluminide, silvering or other type. Internal radiation is thus transmitted solely between the inlet 64 and outlet 66 and the annular beam.

The invention further relates to an assembly 5 comprising four devices 1 as described above, coupled to one another, as illustrated, by way of example, in FIG. 24.

In this example, the first connection part 10 of the first device 1 forms the first element for the adjacent second device. The first device 1 is connected to the second device 1, one via its first connection part 10 and the other via its second connection part 20.

The adjacent second and third devices 1 are each connected together via their first connection part 10, and the adjacent third and fourth devices 1 via their second connection part 20.

Two adjacent devices are coupled together by an assembly ring 70 so as to ensure the holding of the two consecutive connection parts of both devices.

Each of the first and second connection parts comprises snap-fit lugs 72 to allow the fixing of one connection part to another. The snap-fit lugs may all be identical, unless provision is made for a locator system to ensure the satisfactory orientation of the connection parts relative to the axis Z.

In a variant embodiment, the transmission collectors 35, 45 and the balls 50 may be arranged in a tubular manner rather than in a planar manner. By way of example, FIGS. 25 to 28 illustrate an embodiment comprising five transmission tracks 36, 46, the tracks each having the form of a ring of which the interior surface is a portion of a cone, as may be seen in FIG. 26, between which are arranged balls 50 retained in a holding component 52, as in a bearing. There are thus five holding components 52 accommodating five series of balls 50.

Current is supplied to each of the tracks by axial rods 37, 47, passing inside the tracks or outside.

Figure 29A:
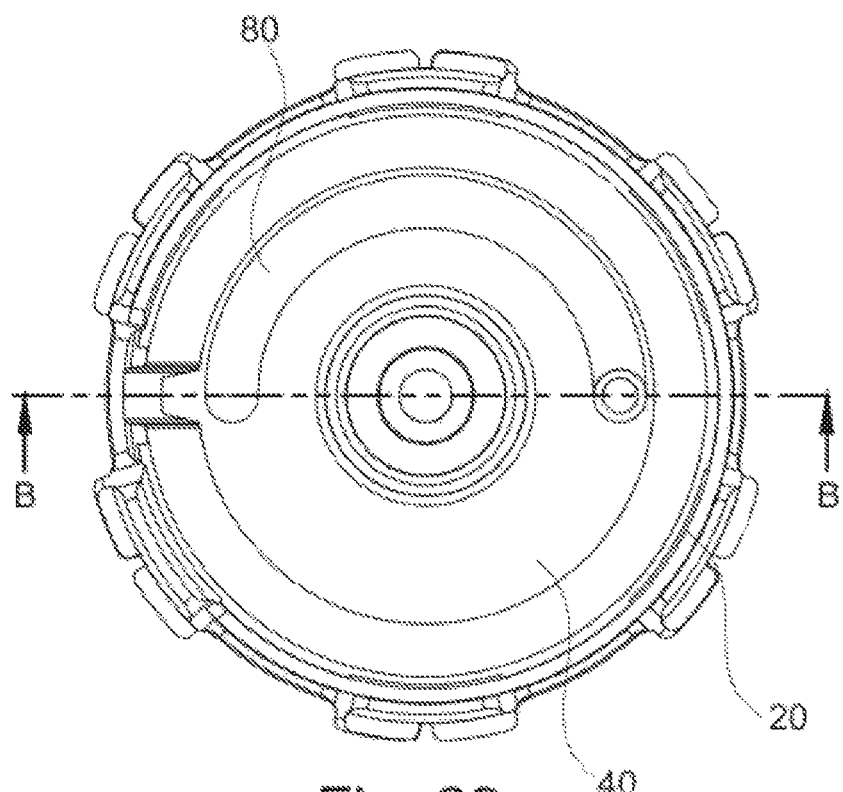
FIG. 29a is a top view, similar to FIG. 4, of a variant embodiment.
Figure 29B:
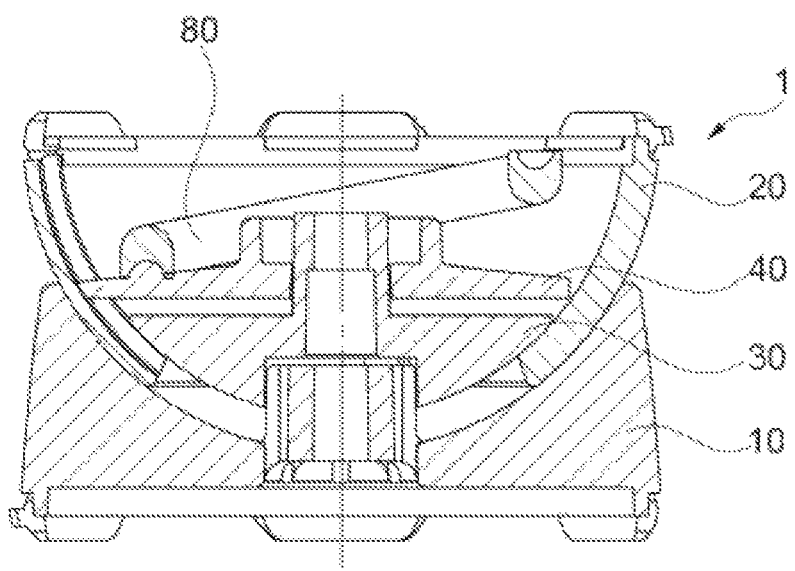
FIG. 29b is a view thereof in transverse section along B-B.

In a variant embodiment, the second part of and the second joining member may be articulated together in a rigid manner. By way of example, FIGS. 29a and 29b illustrates the possibility of connecting the second connection part 20 and the second joining member 40 via a synchronization connecting rod 80 that makes it possible to ensure transmission of the rotational movement of the rotary plate of the second joining member about the axis Z to the second connection part, and vice versa.

The connecting rod may be fixed by means of a ball joint link, on the one hand to the second connection part and on the other to the second joining member.

The device according to the invention may, in a variant, further allow a mechanical link and optical, electrical and fluidic transmission.

By way of example, a further exemplary embodiment is likewise illustrated in FIGS. 30 to 32b, which also comprises a connecting rod 80, wherein the ball joint join is leaktight in such a manner as also to allow a fluidic link in the connecting rod. The connecting rod 80 is hollow and, in this case, comprises a first connecting rod part 81 and a second connecting rod part 82 connected by a translational join, limited in terms of travel and leaktight, such as to allow the fluidic link in the connecting rod 80. The first connecting rod part 81 is configured such as to slide in part in the second connecting rod part 82.

This example differs likewise from the embodiment of FIGS. 1 to 19 in terms of the value of the angles α and β and γ and δ.

Figure 33:
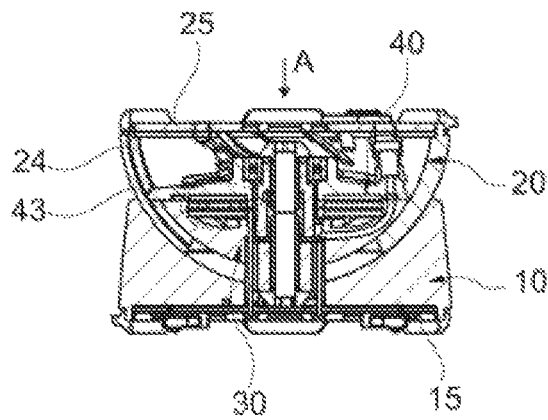
FIG. 33 is a view similar to FIG. 4 of a variant embodiment.
Figure 33A:
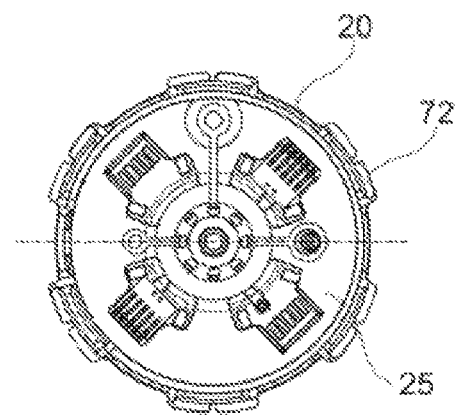
FIG. 33a is a view thereof along the arrow A.
Figure 33B:
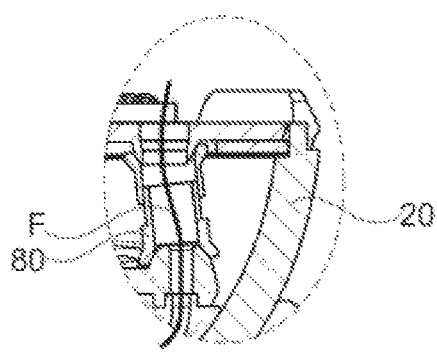
FIGS. 33b to 33e are views of details thereof.
Figure 33C:
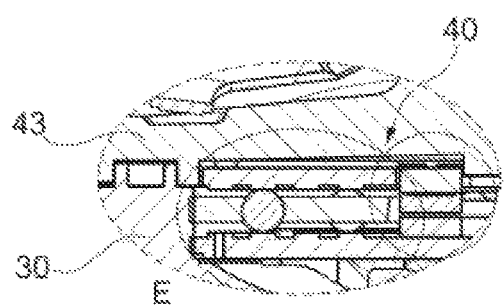
Figure 33D:
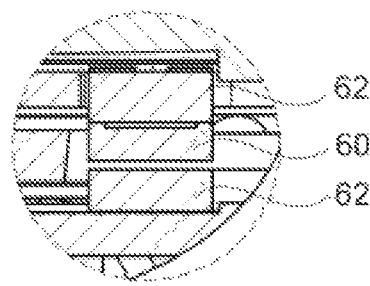
Figure 33E:
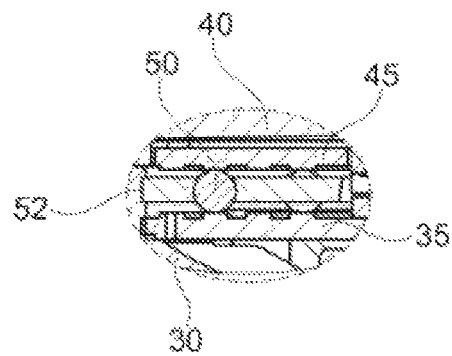

Further illustrated in FIGS. 33 to 33e is a variant embodiment configured such as to allow, simultaneously or successively, optical, electrical and fluidic transmissions. In this example, the device comprises a fluidically leaktight link connecting rod 80 forming a fluidic path F.

Naturally, the invention is not limited to the examples just described. The device may, furthermore, comprise one or more sensors, for example one or more ultrasonic sensors, or even one or more infrared sensors. Such sensors may make it possible to play an anti-collision role or, alternatively, a spatial referencing role.

The invention claimed is:

1. A device for achieving a mechanical link and optical and/or electrical and/or fluidic transmission between a first element (E1) and a second element (E2), comprising:
    a first connection part designed to be fixed to the first element (E1),
    a first joining member connected optically and/or electrically and/or in fluidic communication with the first element (E1) and mounted on the first connection part,
    a second connection part designed to be fixed to the second element (E2), and arranged at least in part between the first connection part and the first joining member and defining a ball joint link between the first and second elements, and
    a second joining member connected optically and/or electrically and/or in fluidic communication with the second element, arranged in the second connection part,
    the first and second joining members being configured to allow an optical and/or electrical and/or fluidic transmission from one to the other.

2. The device as claimed in claim 1, the second connection part being movable in rotation about an axis (Z) of the first connection part through an angle greater than 180°.

3. The device as claimed in claim 2, the second connection part being movable in rotation about at least one axis (X) perpendicular to the axis (Z) through a maximum angle strictly greater than 0°.

4. The device as claimed in claim 1, the first connection part comprising a concave portion and the second connection part having an opposite exterior concavity.

5. The device as claimed in claim 4, the concave portion of the first connection part having an at least partially spherical interior surface and the second connection part comprising an at least partially spherical exterior surface.

6. The device as claimed in claim 1, the first joining member comprising a convex portion and the second connection part having an opposite interior concavity.

7. The device as claimed in claim 1, the second connection part having an at least partially spherical interior surface and the first joining member comprising an at least partially spherical exterior surface.

8. The device as claimed in claim 1, the second connection part comprising an interior surface having a radial groove extending over a part at least of the height of the interior surface.

9. The device as claimed in claim 8, the second joining member comprising a rotary plate equipped with a stud designed to be received in the radial groove of the second connection part.

10. The device as claimed in claim 1, the two first and second joining members each comprising an electric current transmission collector.

11. The device as claimed in claim 10, comprising a plurality of balls arranged between the first transmission collector of the first joining member and the second transmission collector of the second joining member to allow an electric transmission between the first and second collectors.

* * * * *

UNITED STATES PATENT AND TRADEMARK OFFICE
CERTIFICATE OF CORRECTION

PATENT NO. : 11,063,401 B2
APPLICATION NO. : 16/620201
DATED : July 13, 2021
INVENTOR(S) : Sébastien Mallinjoud Page 1 of 1

It is certified that error appears in the above-identified patent and that said Letters Patent is hereby corrected as shown below:

In the Claims

Column 13, Line 20, "second element, arranged" should read -- second element (E2), arranged --

Signed and Sealed this
Eighth Day of March, 2022

Drew Hirshfeld
*Performing the Functions and Duties of the
Under Secretary of Commerce for Intellectual Property and
Director of the United States Patent and Trademark Office*